(12) United States Patent
Murray et al.

(10) Patent No.: US 6,269,654 B1
(45) Date of Patent: Aug. 7, 2001

(54) POROUS LAMINATED, SUPER ABSORBENT, HYDRATABLE, TEMPERATURE CONTROL PACK SYSTEM

(75) Inventors: Joseph C. Murray; Lyman E. Don Gaude; Kimberly Lynn Gabel, all of Mobile, AL (US)

(73) Assignee: Thermal Products, Inc., Mobile, AL (US)

( * ) Notice: Subject to any disclaimer, the term of this patent is extended or adjusted under 35 U.S.C. 154(b) by 0 days.

(21) Appl. No.: 09/079,872

(22) Filed: May 15, 1998

(51) Int. Cl.[7] ....................................... F25D 3/08
(52) U.S. Cl. ............................... 62/530; 62/457.1
(58) Field of Search ..................... 62/529, 530, 259.3, 62/457.1, 457.2; 165/46

(56) References Cited

U.S. PATENT DOCUMENTS

| | | | |
|---|---|---|---|
| 4,908,248 | * | 3/1990 | Nakashima et al. ............ 62/530 |
| 5,031,418 | * | 7/1991 | Hirayama et al. ............. 62/530 |
| 5,150,707 | * | 9/1992 | Anderson ...................... 128/402 |
| 5,697,961 | * | 12/1997 | Kiamil ........................... 607/108 |
| 5,785,980 | * | 7/1998 | Mathewson ................... 424/402 |

* cited by examiner

Primary Examiner—William Doerrler
(74) Attorney, Agent, or Firm—Pugh Associates; C. Emmett Pugh

(57) ABSTRACT

A hydratable packet pad (10) comprising a series of spaced, packet cells (17) made up of a backing sheet (11), preferably of an impervious plastic sheet material, e.g., polyester film, and an upper, porous, sheet (12) permeable to water, of, for example, non-woven polypropylene without any additive(s), with a tacky sealant (13), [e.g., 22.5% ethylene-methyl-acrylate (EMA)], used to affix and seal the two sheets together in a process forming the cells and to initially hold the polymer powder in the cell areas, which are initially deposited on the film in a squat cone, prior to the cells being formed. Within each cell of the packet is a superabsorbent polymeric material (14) of a multiply-cross-linked polymer, for example, a doubly cross-linked sodium polyacrylate polymer. The superabsorbent material also preferably includes no alcohol (OH) functional groups, and the sheeting materials preferably contain no cellulose materials. The superabsorbent polymer also preferably is of the type that is particularly effective in absorbing water. In comparison to the prior art, 1994 predecessor product, the preferred embodiment of the present invention shows over an eight-to-one (>8:1) improvement factor in the thaw time of the pad, indicating a difference in kind, rather than merely of degree, as well as a number of other improvements (note, e.g., the bar chart test results summary of FIG. 6).

20 Claims, 5 Drawing Sheets

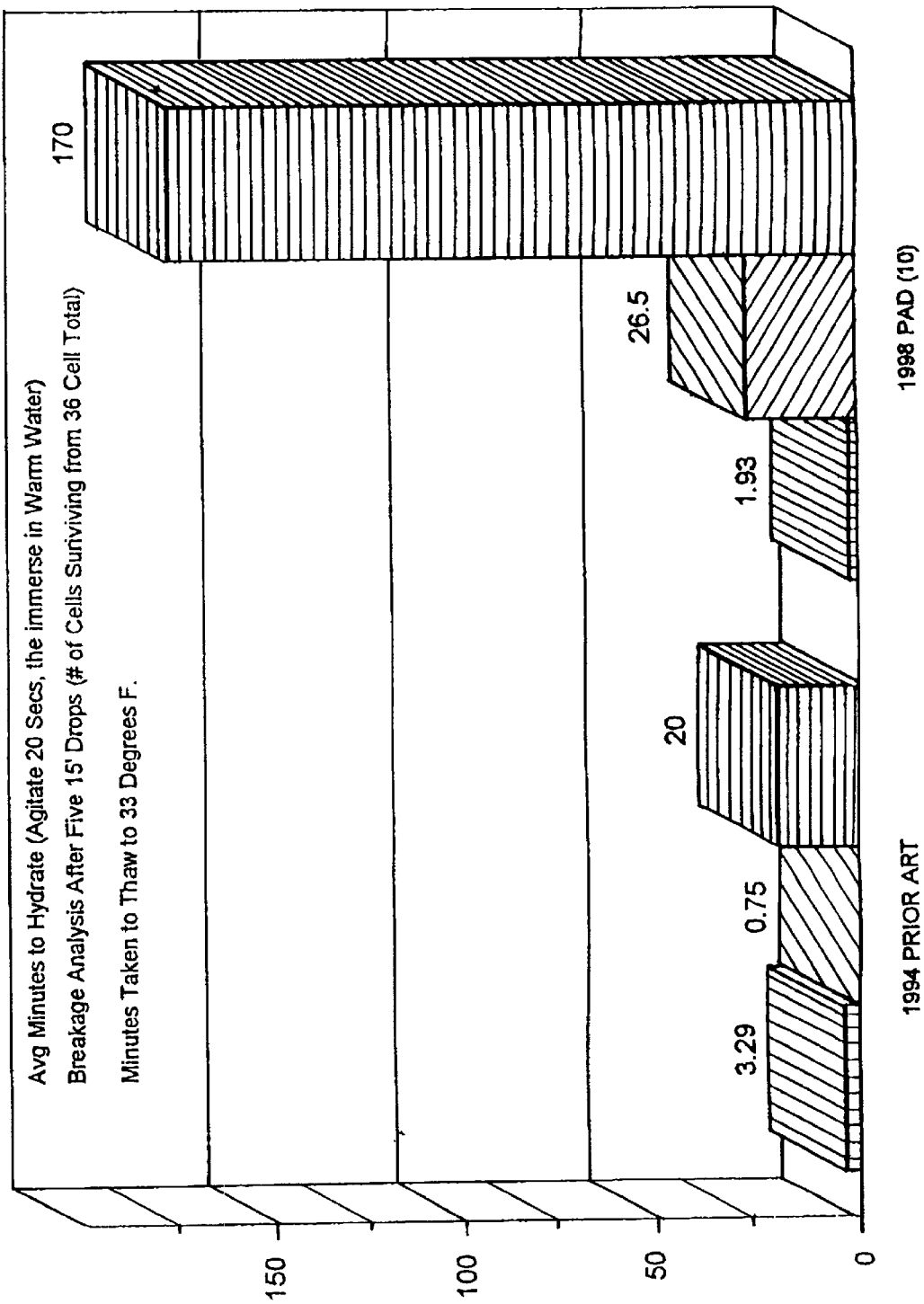

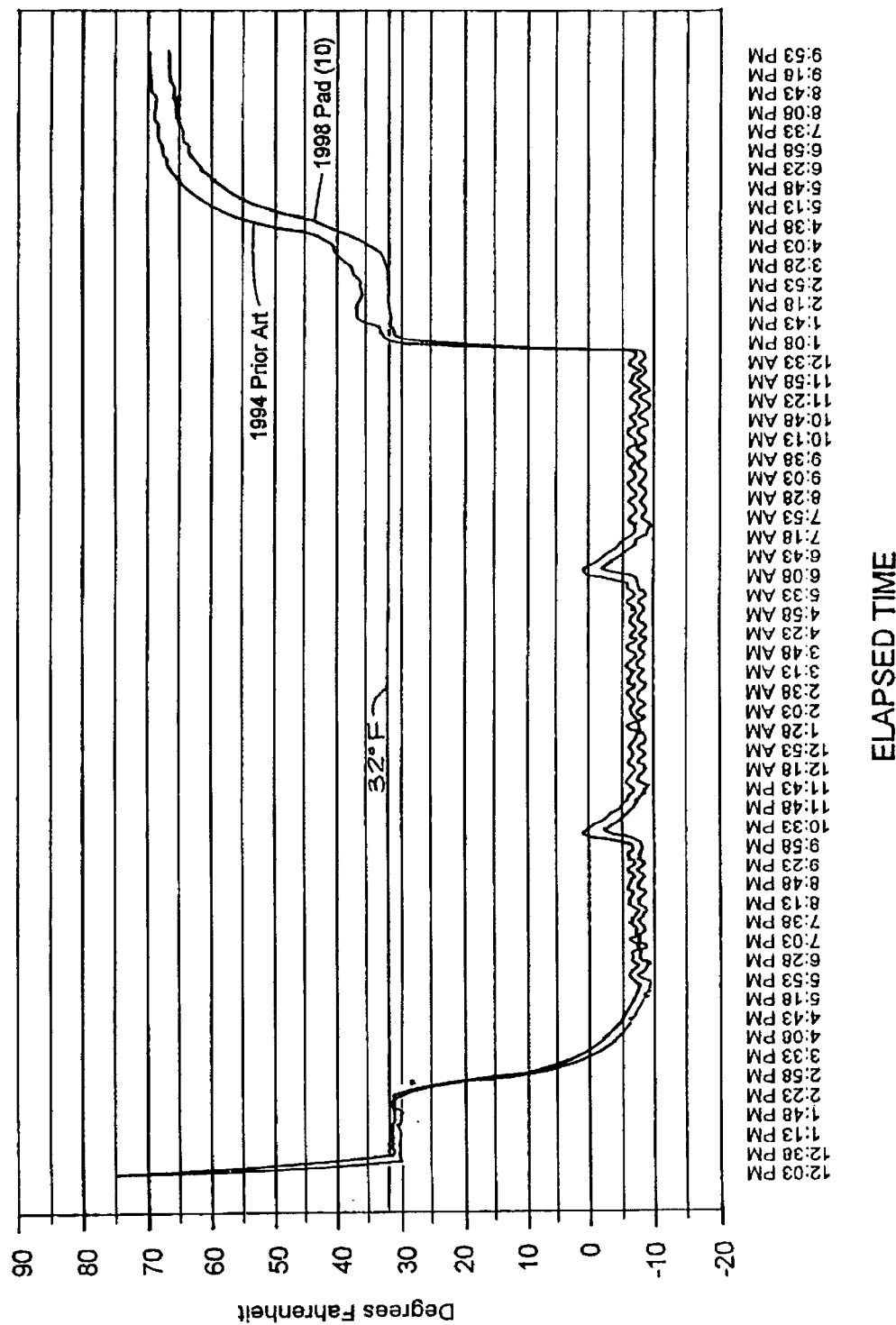

1. In the manufacture of polyester sheeting material, spraying a layer of EMA preferably fully over one of the exterior surfaces or sides of the polyester sheeting, namely the side which will ultimately interface with the porous, permeable fabric material, covering one side's surface of the polyester material in its entirety, that is, from side-to-side and end-to-end.

- - - - - - - - - -

2. In the manufacture of the termperature control packet product, positioning the polyester film with the EMA side up.

3. Depositing superabsorbent, multiply-cross-linked polymer powder 14 (*e.g.*, double cross-linked sodium polyacrylate polymer) on the film sheet 11 on the side with the tacky, EMA adhesive layer 13, in the areas destined to be made into cells (17) basically in the form of a circular cone, preferably with a relative wide base in comparison to its height, for example, in a circular, squat cone having a base with a diameter of three-quarters (3/4") and a height of a quarter (1/4") inch, with these preferred dimensions havng a ratio of three-to-one (3:1), providing a relatively stable, conglomerated pile, with a substantial amount of the powder 14 in contact with the tacky, EMA adhesive layer, substantially stabilizing to some degree all of the polymer powder on the film 11.

4. Juxtaposing a sheet of non-woven polypropylene 12 of comparable width to the polyester sheet 11 facing the EMA layer side.

5. Passsing the two, juxtaposed sheets of polyester and non-woven polypropylene 11 & 12, respectively, (with the polymer cones 14 between them) between, for example, heated, pressurized sealing rollers, activating the ethylene-methyl-acrylate (EMA) layer by the elevated temperature, causing enhanced sealing between the EMA layer 13 and the porous, water permeable polyethylene sheet 12, affixing the two sheets 11 & 12 of material together.

FIGURE 8

POROUS LAMINATED, SUPER ABSORBENT, HYDRATABLE, TEMPERATURE CONTROL PACK SYSTEM

REFERENCE TO RELATED APPLICATIONS

Reference is hereby made to the co-pending patent application entitled "Hydration and Freezing Plant for Flexible Refrigerant Media" filed Jul. 11, 1997 as Ser. No. 08/893,405 by two of the same co-inventors as those of the present application, namely, Messrs. Murray and Gaude, the disclosure of which application is incorporated herein by reference, and also to the patent application entitled "Modular Hydration and Freezing Plant for Flexible Refrigerant Media" filed May 8, 1998 as Ser. No. 09/075,429, now U.S. Pat. No. 5,966,962 issued Oct. 19, 1999 also filed by Messrs. Murray and Gaude, the disclosure of which application also is incorporated herein by reference. Reference is also had to U.S. Pat. No. 5,628,845 issued May 13, 1997 entitled "Process for Forming Hydratable, Flexible Refrigement Media" by Murray and Browne, the former being one of the co-inventors hereof, the disclosure of which application likewise is incorporated herein by reference.

TECHNICAL FIELD

The present invention relates to devices used to produce or maintain desired temperature levels different from the ambient for an extended period of time, and more particularly to hydratable packets made of a superabsorbent material packaged between a backing sheet and a porous sheet sealingly affixed together, with the superabsorbent material being contained in spaced, packets or cells presented in sheet form. Such packet sheets are hydrated, in which process the superabsorbent material absorbs a substantial amount of water, with the packet then being typically frozen or heated (e.g. in a microwave unit) to a relative temperature extreme from the ambient. The frozen or heated packet is then typically placed in a container holding goods to be either kept cooled or hot for a significant period of time.

The invention has particular applicability in the transportation and recreational fields, as well as elsewhere.

BACKGROUND ART

It is well known in the transportation industries to attempt to achieve some degree of desired temperature control, using, for example, gel packs, "dry ice" (frozen carbon dioxide) and the like. However, these products have very limited capabilities in the period of time they can affect the desired temperature and/or pose significant safety hazards.

The present invention solves or at least substantially diminishes these prior art problems with sheets of packet materials which include porous cells containing a superabsorbent polymer. These packet sheets are initially submerged in water, hydrating them, and the hydrated sheets are then frozen (for cooling effects) or heated (for heating effects) and placed in juxtaposition to the goods to be cooled/heated. As the sheet(s) begin, for example, to warm up or thaw, the absorbed water goes directly from the frozen state into a gaseous state, avoiding wetness problems. The cells are formed in packets, producing longitudinally and laterally extended separation lines, which allow the completed packet sheets to be folded about either or both axes and thus contoured around the goods being cooled (or heated).

The background of the present invention goes back to the beginning of the breakthrough technology initially suggested in PCT/US92/06486 (published as WO 93/02861 on Feb. 18, 1993) and invented by George Barrett (now deceased), a predecessor to the work that led up to the present invention. In this PCT application there was disclosed an experimental device formed from composite sheets, namely two, layers of laminated textile material, one of which was semi-permeable to moisture, fused or otherwise sealed together, containing between them discrete quantities of a superabsorbent material in cells arrayed in a regular pattern, which superabsorbent readily absorbed water and could then be frozen to provide a substitute for ice and dry ice. The composite sheets were sealed or bonded together using rollers and applying heat and pressure. The fabric used allowed forming such bonds by thermoplastic fusing and the specification, in an off-hand manner, included the statement "or may involve a suitable adhesive" (page 5, line 1) without any further reference or explanation but instead speaks solely of forming the bond between the sheets using only the sheet materials themselves and heat and pressure to form the bond. As noted on page 7, line 10+, "The fabrics are selected to allow formation of a secure bond there-between using heat and pressure produced in the subject machine." and at page 9, line 16 "The bond is formed under the influence of the heat and pressure thus applied to the bonding area [the area surrounding the cells]." There thus appears to be a teaching away from the use of an adhesive, and there is absolutely no suggestion of putting an adhesive in the areas where the cells are formed, as in the present invention.

The disclosure of this publication is likewise incorporated herein by reference, except for its teaching away from there being an adhesive layer added to one of the layers of sheet material.

In or about 1994 there was a commercialization of such packet sheets using a superabsorbent, single cross-linked polymer (herein after referred to as the "1994 technology" or "1994 product"), described more fully below.

In subsequent U.S. Pat. No. 5,628,845 entitled "Process for Forming Hydratable, Flexible Refrigerant Media" issued May 13, 1997 (filed Sep. 28, 1995) by Murray (a co-inventor hereof) et al, the disclosure of which is incorporated herein by reference, describes the materials to be used in connection with the process to make the flexible refrigerant media as follows:

"a length of impermeable thermally formable media such as a plastic film, for example a 1.22 mil one side sealable biaxially oriented polypropylene film or a 1.75 mil coextruded multiply film including layers of high density polyethylene, a tie layer and a sealant layer. The foregoing examples are not intended to be limiting in as much as the apparatus and process may be used with a number of medias which lend themselves to thermal and pressure bonding." (Col. 2, lines 40–48.);

"a length of a semi-permeable media such as a non-woven fabric. As used herein and as generally understood non-woven fabrics are made directly from fiber rather than yam (sic) by bonding or interlocking of fibers or both, accomplished by mechanical, chemical, or solvent means and combinations thereof. The non-woven fabric and the plastic film are both preferentially a standard width, such as sixty inches" (Col. 2, lines 49–56.); and a "quantity of superabsorbent polymer media appropriately selected from the known superabsorbents such as crosslinked acrylics; starch-graft polymers; cross-linked glycote and cellulose esters; and generally refers to water swellable polymers capable of at least a ten fold absorption of aqueous fluids forming a gel which holds fluids by a physicochemical reaction that is resistant to fluid loss under pressure. In the preferred embodiment, the polymer is powder-like or particulate in nature . . . " (Col. 3, lines 24–34.)

The present invention is directed to a vastly improved and innovative porous, laminated, superabsorbent, hydratable, temperature control pack system, which is able to maintain, for example, its cooling temperature characteristics more than eight (8) times longer than the 1994 technology's hydratable temperature control packet, a factor of more than eight-to-one (>8:1), indicating a difference in kind rather than merely of degree. Additionally, the preferred embodiment of the invention is much stronger and more reliable than the predecessor product.

For further background informational purposes, not prior art purposes, it is noted that, in the above-referenced patent application Ser. No. 08/893,405, the materials disclosed for the plastic film layer is "plastic Polypropylene," for the porous web material "a non-woven fabric such as 2 oz. Polypropylene" and for the absorbent particulate matter "a super absorbent polymer such as sodium polyacrylate, crosslinked."

A listing of prior patents and other publications, which may be relevant to the invention, is presented below:

| U.S. Pat. No. | Patentee(s) | Issue Date |
| --- | --- | --- |
| 4,223,043 | Johnson | 80/09/16 |
| 4,324,111 | Edwards | 82/04/13 |
| 5,147,343 | Kellenberger | 92/09/15 |
| 5,150,707 | Anderson | 92/09/29 |
| 5,313,809 | Issacson et al | 94/05/24 |
| 5,628,845 | Murray et al | 97/05/13 |
| 5,628,845 | Murray et al | 97/05/13 |
| 5,709,089 | Dawson et al | 98/01/20 |

The '089 patent to Dawson and Browne (the latter being a co-inventor of the Murray '845 patent) is not necessarily "prior art" to the present invention, as part of the present invention was made prior to its filing date of Mar. 4, 1996 and the invention itself was made prior to its issue date. In the '089 patent the specification is directed to a bag in whose interior there is a pouch containing a superabsorbent polymer, with the pouch wall having a water permeable portion of a non-woven fabric material. The '809 patent suggests that the water permeable layer could be attached to the water impermeable layer by heat sealing, gluing or the like. As a superabsorbent the patent suggests the use of "Sunwet IM-5700-D" of Sanyo Chemical K.K., a superabsorbent which is not, it is believed, multiply-linked polymer. There is likewise no suggestion of using a supplemental adhesive layer between the sheet materials or, more particularly, where the polymer powder is to be located or placed.

The '089 patent lists the following patents as pertinent art:

| U.S. Pat. No. | Patentee(s) | Issue Date |
| --- | --- | --- |
| 3,066,847 | Fortune | 62/12 |
| 3,559,416 | Cornwall | 71/02 |
| 4,181,285 | Vangedal-Nielsen | 80/01 |
| 4,404,820 | Romaine | 83/09 |
| 4,596,250 | Beisang et al | 86/06 |
| 4,780,117 | Lahey et al | 88/10 |
| 4,856,651 | Francis, Jr. | 89/08 |
| 5,031,418 | Hirayama et al | 91/07 |
| 5,035,241 | Walasek et al | 91/07 |
| 5,054,290 | Hogan | 91/10 |
| 5,150,707 | Anderson | 92/09 |
| 5,263,479 | Tesch | 93/11 |
| 5,271,244 | Staggs | 93/12 |
| 5,393,462 | Avery | 95/02 |
| 5,417,276 | Dobry | 95/05 |
| 5,447,532 | Furuya | 95/09 | while noting that the '418 patent discloses a cooling package utilizing a superabsorbent polymer as one element thereof. The '089 patent specification also references a publication by "Thermonics Incorporated"; 4513 Old Shell Road, Mobile, Ala. 36608, a company with which two of the co-inventors hereof had a relationship.

Also note the above discussed PCT/US92/06486 application by George Barrett (published Feb. 18, 1993, WO 93/02861). It also is noted that the Kellenberger '343 patent includes information on superabsorbent materials and the meaning of superabsorbency.

For general background, informational, not prior art, purposes, reference is also had to the article entitled "Pharmaceutical shipments chill out from within" from the January 1998 edition of Packaging World (a Summit publication, One IBM Plaza, Suite 3131, 330 N. Wabash Ave., Chicago, Ill. 60611; note p. 38), which article discusses some of the beneficial effects of the inventors' test prototypes.

GENERAL DISCUSSION OF INVENTION

The present invention is directed to a vastly improved and innovative porous, laminated, superabsorbent, hydratable, temperature control pack system and pad using two sheets of material, at least one of which is porous, containing packets of superabsorbent material, in which the superabsorbent polymer preferably is multiply cross-linked, for example, doubly cross-linked, with sodium polyacrylate being an exemplary, double-cross-linked polymer, and preferably in which supplemental, adhesive, sealing material is included between the two sheets for enhanced bonding between the sheets, forming better, more reliable sealing edges around the packet cells containing the superabsorbent polymer, as well preferably as the areas of the cells wherein the polymer resides, causing a substantial part of the polymer powder to be held to the underlying sheet. In comparison to the prior art, 1994 predecessor product, the preferred embodiment shows over a eight-to-one (>8:1) improvement factor in the thaw time of the pad, indicating a difference in kind, rather than merely of degree.

The superabsorbent material also preferably includes no alcohol (OH) functional groups, and the sheeting materials preferably contain no cellulose materials. The superabsorbent polymer also preferably is of the type that is particularly effective in absorbing water.

This preferred, exemplary embodiment is a lamination, consisting of a web of plastic film sealed to a web of non-woven fabric. The lamination pattern is a series of, for example, two inch by two inch (2"×2") cells or pockets across the web. Each cell contains a small volume of superabsorbent, multiply-cross-linked polymer. An exemplary production machine (see, for example, that generally disclosed in the '845 patent) is capable of producing a master web that is, for example, sixty (60") inches wide, containing, for example, of forty-eight (48) cells in its width. The standard unit of sale is designed to be, for example, a roll of fifteen (15") inch wide [six (6) cell width] by three hundred (300') feet long.

The performance of this refrigerant/heating embodiment is extraordinary in laboratory and field tests. It remains in a frozen state longer than gel packs and dry ice in similar ambient or sealed package conditions.

In comparison to the prior art, the current product is substantially different in materials of construction, components and structure and manufacturing technique. This provides great strength of construction, and the structural changes provide a substantial evaporative cooling advantage.

The original plastic film was polypropylene with no special sealing layer between the plastic film and fabric. In the prior art version of the product, a much less reliable "fusion" seal was achieved with heat and pressure with no sealing additive. In the preferred embodiment of the present invention, the plastic base film is polyester, with, for example, a special, twenty-two and a half (22.5%) percent ethylene-methyl-acrylate (EMA) sealing layer applied to the film.

In production, the heat diffuses the special EMA layer and promotes conditions suitable for a fusion seal. The pressure completes the process, firmly engaging the fibers of the fabric into the polymer of the plastic film. In addition to the fusion sealing action, the EMA seals the two webs together at the sealing points. The EMA also tends to "dam" along the inner edges of the cell seal line, further strengthening the seal. Additionally, the presence of the adhesive EMA layer in the areas of the superabsorbent polymer cells, where there is no face-to-face sealing of the sheet materials, helps hold the polymer powder, preferably initially deposited in a squat cone configuration, in the desired soon-to-be-formed cell areas during the manufacturing process.

The operative theory of the design calls for the user to cut custom-sized pads from the standard roll. Cutting preferably is done along the quarter (¼") inch sealing lines. The resulting pads are hydrated preferably in warm water for no more than, for example, three (3) minutes. The pads then are frozen in, for example, a standard home, or other commercial type, freezer, and then are ready for use to cool or maintain the coolness of a product. The hydration and freezing also can take place in a specialized modular apparatus, such as that disclosed in the Murray-Gaude pending application of May 8, 1998 referred to above.

It thus is a basic object of the present invention to provide a more reliable packet material with greatly enhanced temperature holding times and a substantially extended thawing time (when used in cooling applications).

It is also a basic object to form more secure, reliable cell structures for the superabsorbent polymer and a further object to better hold a significant portion of the polymer powder in the soon-to-be-formed cell areas during the manufacturing process.

BRIEF DESCRIPTION OF THE DRAWINGS

For a further understanding of the nature and objects of the present invention, reference should be had to the following detailed description, taken in conjunction with the accompanying drawings, in which like elements are given the same or analogous reference numbers, and wherein:

FIG. 2 is a side, cross-sectional view of a section of the embodiment of FIG. 1; while

FIG. 4 is a perspective view showing a part of the pad roll of FIG. 3 used to wrap an exemplary fish as an example application of the pad material of the invention; while

FIG. 6 is a bar chart diagram comparing the time in minutes for the preferred embodiment ("1998 Pad") to hydrate and to thaw in comparison to the predecessor, 1994 product, showing an improvement factor of over eight-to-one (>8:1) in the time to thaw, approximately a fifty (50%) percent improvement in the reduced time to hydrate the pads, and over a ninety-one (91+%) percent improvement in breakage characteristics.

FIG. 7 is a graph of the actual test data upon which the "thaw minutes" part of the bar chart of FIG. 3 is based, graphing the relative temperatures of the pads in degrees Fahrenheit over time measured in minutes; it being noted that other test data are presented in tables included below.

FIG. 8 is an exemplary flow chart outlining an important aspect of the basic manufacturing methodology of the present invention.

EXEMPLARY MODE FOR CARRYING OUT THE INVENTION

EXEMPLARY EMBODIMENT (FIGS. 1–3)

Figure 1:
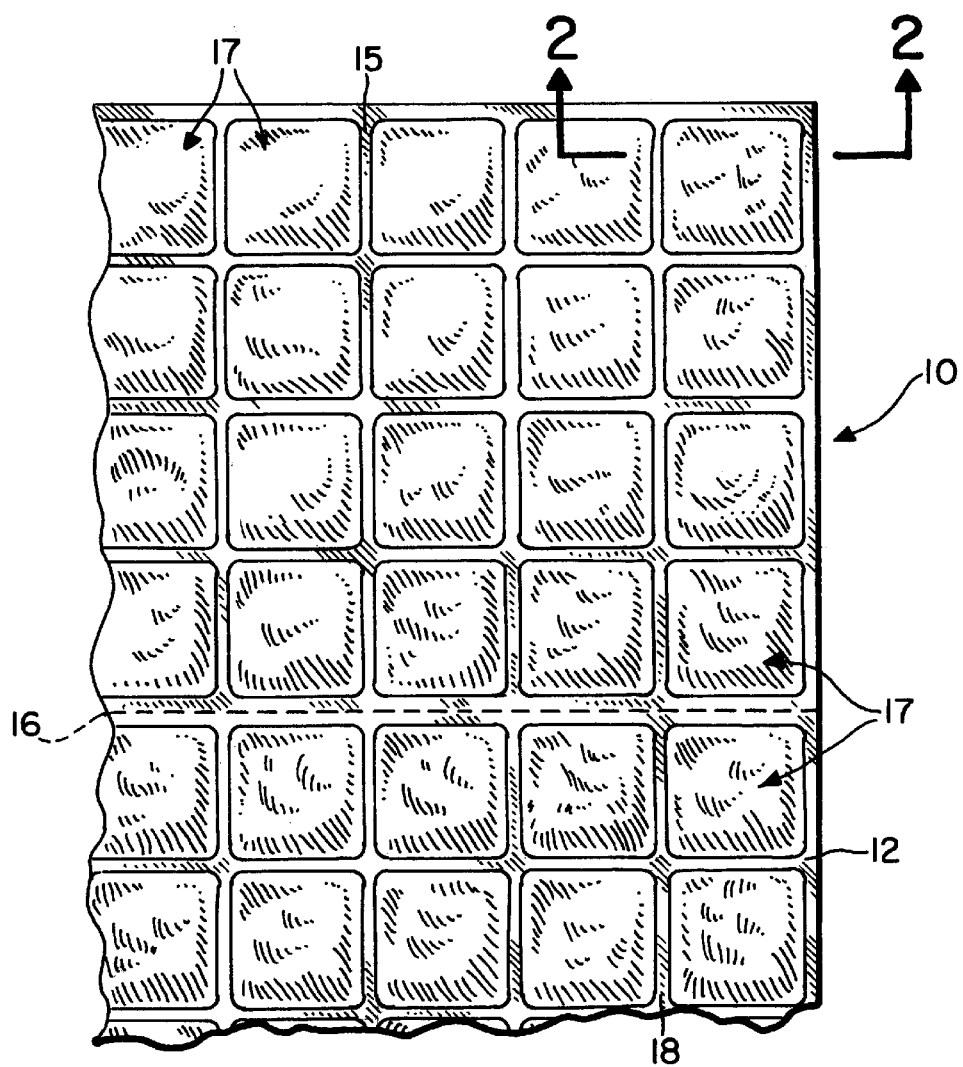
FIG. 1 is a plan view of the exemplary, preferred embodiment of the finished hydratable packet pad or sheet of the present invention.
Figure 2:
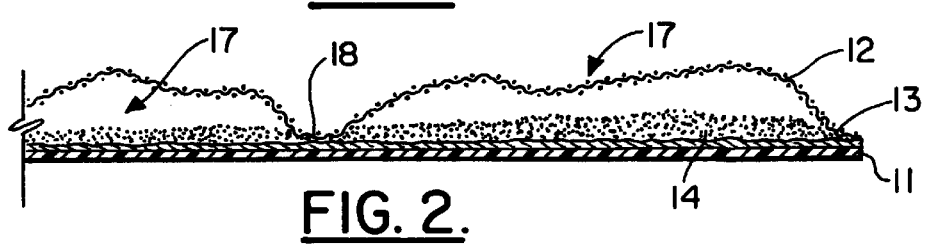
Figure 3:
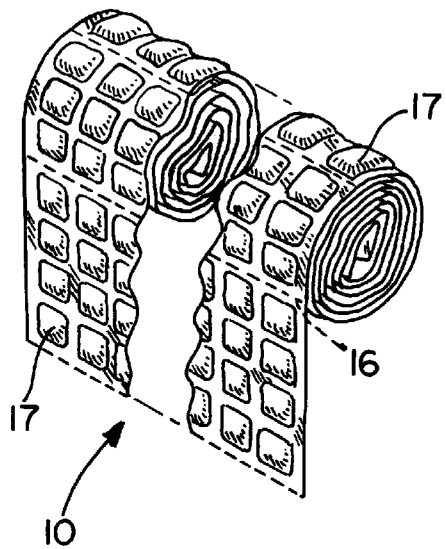
FIG. 3 is a perspective view of the pad of FIG. 1 in roll form as provided, for example, to the end industrial user.

As can be seen in FIGS. 1–3, the initial, exemplary embodiment of the hydratable sheet packet material of the present invention comprises an extended sheet 10 of packets made up of a backing sheet 11, preferably of an impervious plastic sheet material (such as, for example, polyester film), and an upper, porous sheet 12 (such as, for example, non-woven polypropylene with no additives), with a preferably tacky, sealant or adhesive layer 13 [e.g. 22.5% ethylene-methyl-acrylate (EMA)], about one mil (0.0001") thick (or equivalently 14.4 lbs. per ream of the finished sheet material), used to affix and seal the two sheets 11 & 12 together along longitudinally and laterally extending lines 15 & 16, respectively, defining a series of cells 17 with the cells effectively joined by the flat areas 18 between adjacent cells.

Figure 2A:
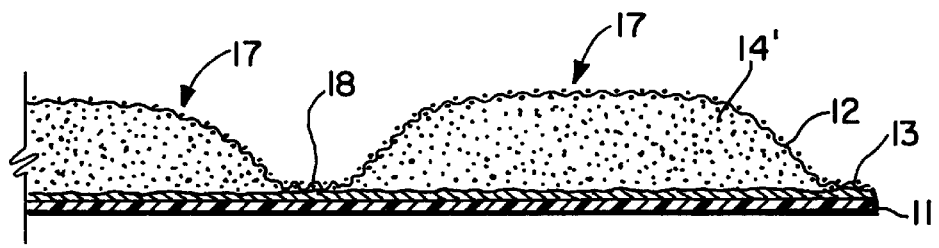
FIG. 2A is similar to FIG. 2 but with pad having been hydrated, with the superabsorbent polymer having superabsorbed the water and having been frozen ready for end use, it being noted that these figures are not construction or "to-scale" drawings but rather generalized ones, as is typical of patent application drawings.

Contained within each cell 17 of the packet sheet 10 is an appropriate amount of superabsorbent, polymer 14. As can be seen in FIG. 2, the polymer powder 14 initially occupies only a small amount [perhaps about fifteen (15%) percent] of the total interior volume of the cell 17. This allows room for the approximately ten (10) fold expansion which occurs as the polymer 14 is hydrated by being soaked in water, which the polymer superbly absorbs, and the hydrated polymer ultimately frozen. As shown in FIG. 2A, in this hydrated state, the hydrated polymer 14 expands and fills out the interior of the cell 17.

Additionally, when the polymer powder 14 is initially deposited on the film sheet 11 with its tacky adhesive layer 13, it is deposited in the area destined to be made into a cell (17) basically in the form of a circular cone, preferably with a relative wide base in comparison to its height, for example, in a circular cone having a base with a diameter of three-quarters of an inch (¾") and a height of a quarter (¼") inch, with these preferred dimensions having a ratio of three-to-one (3:1). For enhanced polymer pile stability, it is believed that the minimum ratio should be at least about two-to-one (2:1).

This provides a relatively stable, conglomerated pile, with a substantial amount of the powder 14 in contact with the tacky adhesive layer, substantially stabilizing to some degree all of the polymer powder on the film 11. As a result, the entire pile is much more stable, resulting in little or no loss of powder outside of the cell area 17 as the film 13 with the polymer powder 14 on it moves to the heat/pressure sealing rollers.

The polymer 14 preferably is multiply-cross-linked and preferably contains no alcohol, such as, for example, double-cross-linked sodium polyacrylate polymer, such as that of Stockhausen, Inc.'s "AP88" superabsorbent polymer, preferably in powder or particulate form.

"AP88" is a double-cross-linked, sodium polyacrylate that contains no alcohol component and more particularly no poly-alcohols. Stockhausen, Inc. is located at 2401 Doyle St., Greensboro, N.C. 27406. In contrast, the absorbent material used in the 1994, prior art packet cell was Stockhausen's "FAVOR® SAB 800," a superabsorbent polymer with a chemical basis of a salt of cross-linked polyacrylic acid/polyalcohol grafted copolymer, which material in only singly cross-linked and contains polyalcohol with a number of alcohol (OH) functional groups.

The use of a double-cross-linked or higher (2+) cross-linked polymer for the superabsorbent material 14 provides a much more effective product which is able to contain fluids, such as the product's hydration water. Additionally, the use of a superabsorbent polymer which does not contain any alcohol functional groups, particularly any polyalcohols, provides for a more stable, safer product due in part to the absence of the volatility and combustibility such polyalcohol polymers typically have. As a result of the double-cross-linking of the superabsorbent material 14, the packet cells contain and hold the hydration water longer, slowing the thawing process, producing the greater than eight-to-one (>8:1) advantage the preferred embodiment of the invention has over the 1994 product and is highly pressure resistant.

The table below presents comparative characteristics of the preferred embodiment of the invention (using "AP88" for the superabsorbent, multiply-cross-linker polymer) and the 1994, prior art product which used the "FAVOR® SAB 800" polymer, some of which characteristics, it is noted, are not important with respect to the invention, but are provided for general background information.

| CHARACTERISTIC | "AB88" (Preferred Embodiment) | "FAVOR ® SAB 800" (Prior Art) |
| --- | --- | --- |
| Chemical Constituent(s) | sodium polyacrylate, cross-linked polymer | sodium salt of cross-linked polyacrylic acid with polyalcohol; polyacrylate/poly-alcohol copolymer; a poly-alcohol polymer |
| Nature of Cross-Linking | Double Cross-Linked | Single Cross-Linked |
| Polyalcohol (OH) Content | No | Yes |
| Physical Form | white granules | white granules |
| Particle Size | 100–800 microns | 100–800 microns |
| Product Density | 540 g/l ± 30 | 540 g/l ± 30 |
| Sifting Properties | free flowing | free flowing |
| Moisture Content | 5% ± 2 | 5% ± 2 |
| pH Value (1% gel @ 0.9% NaCl) | 5.0–7.0 | 6.0 ± 0.5 |
| Storage | >1 year under dry conditions | >1 year under dry conditions |
| Boiling Point | solid (not established) | solid (not established) |
| Vapor Pressure (mm Hg.) | <10 | <10 |
| Vapor Density (AIR = 1) | none (not exact) | none (not exact) |
| Specific Gravity ($H_2O$ = 1) | bulk density 0.4–0.7 | bulk density 0.4–0.7 |
| Melting Point | >390° F. | >390° F. |
| Evaporation Rate (Butyl Acetate = 1) | <1 | <1 |
| Solubility in Water | insoluble | insoluble |

Additionally it is desired that the absorbency of the polymer material 14 be customized to particularly absorb water molecules versus other liquids, such as, for example, oil.

The temperature control packet material 10 can be provided in sheet form with a number of spaced cells 17 in, for example, an array of six (6) cellular packets wide [fifteen (15") inch wide roll] in a roll (note FIG. 3) three hundred (300') feet long, each packet being a square of an exemplary two (2") inches per side, with the separation distance between adjacent packets 14 being, for example, a half (0.5") inch.

Figure 4:
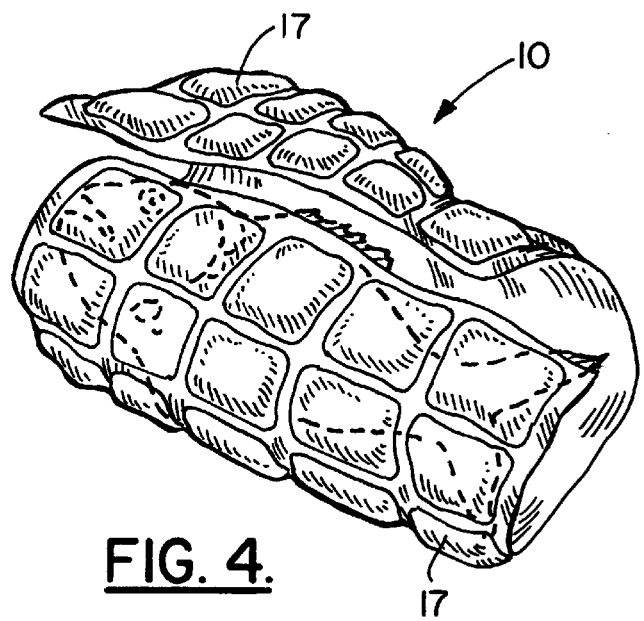
Figure 5:
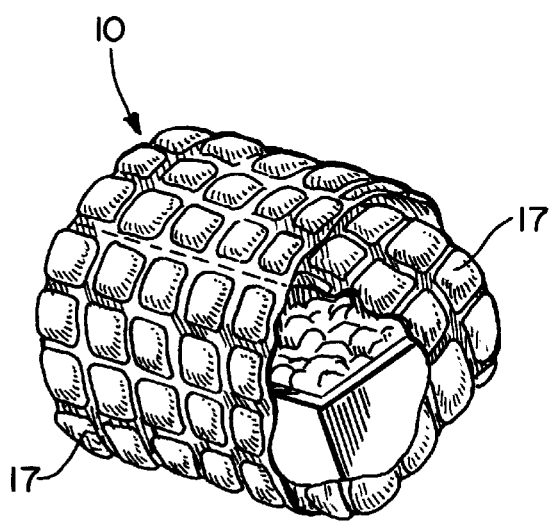
FIG. 5 is a perspective view showing a part of the pad roll of FIG. 3 used to wrap an exemplary box of temperature-sensitive material as a further example application of the pad material of the invention, with it being understood that there are many other possible applications of the pad material of FIG. 3.

The end user then can cut a desired size sheet of the packet material along one of the longitudinal and/or lateral lines 15 & 16 separating a contiguous series of the cells 17 and use the cut section to, for example, wrap around the object for which such temperature control or adjustment is desired or needed. Examples include the wrapping of the cut section around a fish, as shown in FIG. 4, or around a package of a temperature sensitive product, such as the generalized one shown in FIG. 5. Additionally or alternatively, the desired size of the packet material 10 can be used in various "ice" chests or packing/shipping containers or otherwise beneficially used. These are, of course, are examples which merely "scratch the surface" of uses.

The preferred embodiment of the packet sheet material of the invention can be made using the general process and machinery disclosed in U.S. Pat. No. 5,628,845, with the addition of adding an adhesive, sealing material (13) preferably to the plastic film polyester material 11 by, for example, spraying one side of the polyester material with an adhesive, such as EMA, producing an adhesive, sealing layer on top thereof, preferably across its entire face, i.e., from side-to-side and end-to-end, during, for example, the manufacture of the polyester sheet material.

The use of a polyester film for the plastic sheeting material 11, rather than, for example, polypropylene, is that, inter alia, polyester has a higher melting temperature and thereby enhances the seal produced by the EMA material 13. Additionally, the polyester material is much stronger. A gauge of about four and eight-tenths (4.8) or greater (for example, 4.72 or 4.92) for the polyester film 11 is preferred.

In the manufacture of the polyester sheeting material the EMA preferably is sprayed on fully over one of the exterior surfaces or sides of the sheeting, namely the side which will ultimately interface with the porous, permeable fabric material, covering one side's surface of the polyester material in its entirety, that is, from side-to-side and end-to-end.

When the two sheets 11 & 12 of polyester and non-woven polypropylene, respectively, are passed between, for example, heated, pressurized sealing rollers (such as the rolls 33 & 43 of the '845 patent), the ethylene-methyl-acrylate (EMA) layer is activated by the elevated temperature, causing enhanced sealing between the EMA layer 13 and the porous, water permeable polyethylene sheet 12, affixing the two sheets of material together.

Additionally, the initial presence of the sprayed EMA layer 13, which is slightly tacky, on the plastic film 11 helps to hold the superabsorbent polymer material 14 in powder form to the film 11 after the film leaves, for example, the dispersing roller (23) of the '845 patent. This tacky or sticky contact of the underlying EMA layer with a substantial portion of the particulate, superabsorbent polymer, initially deposited on the film 11 in a squat cone, helps to hold the polymer in place during the cell manufacturing operation. Any polymer powder 14 that falls off of the cone, which is typically very little, typically falls off close to the base, still in the cell area. Thus, in the preferred embodiment of the invention the adhesive layer 13 is present throughout, even where it is not being used to seal the two sheet materials 11 & 12 together, that is, even in the interior areas of the cells 17.

Although twenty-two and a half percent EMA currently is preferred, with the percentage being based on the volume of the methyl-acrylate to the ethylene in the polymer blend, it is believed that EMA in the range of about twenty-two to about twenty-four (22–24%) percent would likewise work.

This aspect of the invention's methodology is outlined in the flow chart of FIG. 8. As noted in FIG. 8, the exemplary, currently preferred method of the present invention for making a hydratable, temperature altering packet from the two, flexible sheets of material 11 & 12, the latter one of which is permeable to liquid, particularly or especially water, which packet contains the superabsorbent material 14 in particulate form contained within at least one cell 17 formed between the two sheets of material, comprises the following steps:

a) using for at least one of the sheets of material a sheet having thereon an adhesive, sealing layer 13 on one of its sides;

b) placing the other sheet of material in juxtaposition to the first one of the sheets opposite to its adhesive side, and, in connection therewith, placing some of the particulate superabsorbent material onto that one sheet with a substantial portion of the particulate material being in sticking contact with the adhesive layer, which adhesive layer serves to at least initially hold the particulate material in place on that sheet; and c) sealing the two sheets together, forming a cell of substantially greater volume than the supply of superabsorbent material so that the cell contains the particulate, superabsorbent material, and using the adhesive layer to also seal the two sheets together to form the respective cell.

In this process, preferably at the time the sheet material is made, the adhesive layer is sprayed unto one side of the first one (11) of the sheets, covering the sheet fully over one of its sides. The two sheets are ultimately sealed together by applying heat and pressure in the areas surrounding the longitudinal and lateral lines 16 of the two sheets surrounding the respective cell to seal the two sheets together.

Besides EMA examples of exemplary heat sealing enhancing materials are ethylene-vinyl-acetate (EVA), which is not as effective as EMA, or a cast polypropylene film, which requires very high sealing pressures and/or temperatures, and therefore is not as desirable as EMA in the preferred combination of the present invention. The preferred twenty-two and a half (22.5%) percent EMA coated polyester film is available from Ropak Int'l, Roselle, Ill.

With respect to the permeable, polypropylene sheet 12 of non-woven fabric, it preferably has a significant degree of porosity or permeability, allowing the hydration process to quickly proceed and preferably is made of non-woven, plastic material (for example, non-woven polypropylene), preferably containing no cellulose material. Non-woven plastic material sheeting is typically made from pieces of the desired plastic material, which are then caused to become porous sheeting by having, for example, diamond-shaped, heated pins inserted within and through the mass of collected, plastic material, and concurrently or sequentially pressed to form sheet material, with heat from the pins and/or elsewhere causing the surrounding plastic material to fuse together with openings formed therein for porosity, allowing water to enter the cells 17 during the hydration step and water vapor to escape in, for example, the thawing step.

The exemplary materials for the completed packet sheets for the preferred ("1998") embodiment (10) vs. the 1994, prior art product are summarized in the following table:

| Item | Preferred Embodiment 10 | 1994 Product |
|---|---|---|
| Backing Sheet (11) | polyester film | polypropylene film |
| Porous Sheet (12) | non-woven, polypropylene fabric sheeting | non-woven, polypropylene fabric sheeting |
| Added Sealing Material (13) | EMA | None |
| Powder (14) for Cell (17) | sodium polyacrylate, double-linked, devoid of alcohol (OH) functional groups | salt of single cross-linked, polyacrylic acid/polyalcohol grafted copolymer |

INITIAL COMPARATIVE TESTS

PRIOR ART, 1994 PRODUCT vs. PREFERRED EMBODIMENT (10)

This test series was performed and designed to show product improvements between the prior 1994 technology's packet (prior art) and the preferred embodiment 10 of the present invention ("the 1998 pad").

Test Purpose

This initial test was designed to compare the 1998 pad's performance to the 1994, prior art product's performance.

The tests conducted showed substantial improvements in hydration speed, freeze sustainability and seal strength. All comparative tests were done at the same time in the same temperature water and at the same freezing and thawing temperatures. Thus, all performance differentials were a precise reflection of product performance only, with no variances caused by time or other differentials. The 1994, prior art product had been safely stored and protected against humidity, the only major element that causes degradation over time.

Materials (1) 6×6 pad of 1994 product
(1) 6×6 pad of 1998 embodiment

Test Apparatus (2) "Stowaway" temperature probes
(1) Laboratory Freezer
(1) PC for data analysis Test Discussion Test results are shown graphically and in summary reports for each test in FIGS. 3 & 4. Hydration times were measured with a stop watch and a stand-alone timer. Temperature measurements were taken every three (3) minutes and twenty (20) seconds by the sensors embedded in the center cell of each pad.

After the pads were hydrated the total freeze/thaw portion of the test covered thirty-four (34) hours. During the time the two pads were in the freezer, and after their temperature dropped below zero, the preferred embodiment 10 ("1998") pad of the invention had a consistent average temperature advantage over the 1994, prior art product of one and sixty-seven hundredths (1.67° F.) degrees Fahrenheit.

After the two pads were removed from the freezer, they were laid on a counter top in the lab, while the ambient temperature was approximately seventy-eight (78° F.) degrees Fahrenheit. They stayed there from 1:03 PM to 10:03 PM to permit the thermocouples to accurately measure the temperature rises as they thawed. The 1994, prior art product reached thirty-three (33° F.) degrees Fahrenheit in twenty (20) minutes. The preferred embodiment 10 ("1998") pad did not reach thirty-three (33° F.) degrees Fahrenheit for one hundred and seventy (170) minutes, that is, for two and eighty-three hundredths (2.83) hours. There was absolutely no variation in ambient temperature between the pads. They were side-by-side on the counter.

Comparative Materials of Construction

The 1994, prior art product was made from the following:

| | |
|---|---|
| Plastic Film (comparable to 11) | Polypropylene Film |
| Non-Woven Fabric (comparable to 12) | Polypropylene with no additives |
| Sealant Layer (comparable to 13) | None |
| Polymer (comparable to 14) | Favor 800 Super Absorbent Polymer |

The present invention's exemplary embodiment 10 was made from the following:

| | |
|---|---|
| Plastic Film 11 | Polyester Film |
| Non-Woven Fabric 12 | Polypropylene with no additives |

-continued

| | |
|---|---|
| Sealant Layer 13 | 22.5 % EMA |
| Polymer 14 | SuperAbsorbent, Multiply-Cross-Linked Polymer ("AP88" sodium polyacrylate polymer) |

Initial Test Conclusions

The exemplary embodiment of present invention proves significantly more effective than the 1994, prior art product. It is believed that the reasons for those improvements include the following:

A very significant variation was the change from a single cross-linked, superabsorbent polymer, namely "Favor 800," to a multiply cross-linked, superabsorbent polymer, namely "AP88," substantially improving hydration speed due to the nature of the polymer. The application of that type of multiply-cross-linked polymer in a temperature control packet sheet (10) is unique in the inventors' experience.

The plastic film of the prior art did not seal consistently and well to the non-woven fabric, although both materials were supposed to fusion bond under heat and pressure since they were of the same chemical composition. The EMA layer of the invention's preferred embodiment is specifically designed to seal to polypropylene. Using polyester film for improved strength and an EMA sealing layer provides a stronger product and more effective seals.

Additionally, there is the further significant improvement in the well formed, sealed and contained cells for the polymer powder with the presence of the tacky adhesive layer in the cell area itself to help maintain the powder within the cell base area, as opposed to some of it migrating out of the cell base area.

Also, the particular combination of materials likewise helps to produce a far better product.

FURTHER, "HYDRATION" COMPARATIVE TESTS

PRIOR ART, 1994 PRODUCT vs. PREFERRED EMBODIMENT (10)

Four thirty-six (36) cell pads of each type were prepared for testing. The average results are calculated below. Each pad was agitated for thirty (30) seconds, then placed in still water until all the cells were fully hydrated (cells filled). The water was a constant "hand warm" temperature [one hundred (100° F.) degrees Fahrenheit.

| AVERAGE HYDRATION TIMES in MINUTES | | |
|---|---|---|
| Test Run # | 1994 Prior Art | 1998 Pad (10) |
| 1 | 3.10 | 2.01 |
| 2 | 3.67 | 2.08 |
| 3 | 2.25 | 2.46 |
| 4 | 4.14 | 1.18 |
| Average Time | 3.29 | 1.93 |

The indicated advantage of the preferred embodiment 10 over the 1994 prior art product is over forty-one (41+%) percent.

FURTHER, "DROP" COMPARATIVE TESTS

PRIOR ART, 1994 PRODUCT vs. PREFERRED EMBODIMENT (10)

An additional set of comparative tests between the preferred embodiment 10 and the 1994 product included a "drop" test for breakage analysis, with the test data presented below. In the tests eight hydrated pads were dropped, five times each, from a fifteen (15') foot height onto a concrete floor. This was designed to be a "torture test," replicating more than the impact forces the product will be subjected to during normal truck transit. This test indicates sealing strength. Each pad weighed two and a half (2.5#) pounds.

| | 1994 | | 1998 (10) | |
|---|---|---|---|---|
| # Cells Test Run # | # Cells Broken | # Cells Surviving | # Cells Broken | Surviving |

BREAKAGE ANALYSIS - Number of Cells Broken and Surviving in a Total of Five Drops for Each Type of Pad

| | | | | |
|---|---|---|---|---|
| 1 | 36 | 0 | 8 | 28 |
| 2 | 34 | 2 | 11 | 25 |
| 3 | 3 | 0 | 10 | 26 |
| 4 | 35 | 1 | 9 | 27 |
| Average Result | 35.2 | 0.75 | 9.50 | 26.50 |

The indicated advantage of the preferred embodiment 10 over the 1994 prior art product is over thirty-five and a third times (0.75/26.50).

It is noted that the embodiment(s) described herein in detail for exemplary purposes are of course subject to many different variations in structure, design, application and methodology. For further examples, the adhesive layer could be added only where the polymer powder is to be placed and not in the sealed, cell surrounding areas 18, although it is currently preferred to have the adhesive layer cover the entire surface of the backing film, as described above. Likewise, water permeable material could be used for both sheets of material (11 & 12), if so desired, or the water permeable material could be used only in the areas where the superabsorbent polymer is located or only in part(s) thereof, although again the embodiment described in detail above is currently preferred. Also, the adhesive layer could be put on both sheets of material or only the permeable one, but again the embodiment illustrated and described in detail is currently preferred.

Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

We claim:

1. A hydratable packet (10) for producing for juxtaposed goods a temperature environment substantially different in temperature from the ambient for a significant period of time, comprising:

a backing sheet (11);

a porous sheet (12) with said backing sheet and said porous sheet being attached together at selected portions thereof;

a heat activated sealant layer (13) on at least one of the sheets affixing said sheets (11 & 12) together, said sealant being ethylene-methyl-acrylate (EMA); and superabsorbent material (14) contained between said sheets, said superabsorbent material being a multiply-cross-linked polymer, superabsorbent to water.

2. The hydratable packet of claim 1, wherein:

said superabsorbent material is doubly-cross-linked sodium polyacrylate.

3. The hydratable packet of claim 1, wherein:

said superabsorbent material is in particulate form; and wherein:

said adhesive layer underlies and is in sticking contact with a substantial portion of said superabsorbent material.

4. The hydratable packet of claim 1, wherein:

said EMA is about twenty-two and a half (22.5%) percent.

5. The hydratable packet of claim 1, wherein:

said superabsorbent polymer is devoid of alcohol (OH) functional groups.

6. The hydratable packet of claim 1, wherein:

said sheets are devoid of cellulose.

7. The hydratable packet of claim 1, wherein:

said backing sheet is made of an impervious plastic sheet material of polyester film.

8. A method of making a hydratable, temperature altering packet from two, flexible sheets of material, at least one of which is permeable to liquid, which packet contains a superabsorbent material in particulate form contained within at least one cell formed between the two sheets of material, comprising the following steps:

a) using for at least one of the sheets of material a sheet having thereon an adhesive, sealing layer on one of its sides;

b) placing the other sheet of material in juxtaposition to said one of the sheets opposite to its adhesive side, and, in connection therewith, placing some of the particulate superabsorbent material onto said one sheet with a substantial portion of said particulate material being in sticking contact with the adhesive layer, which adhesive layer serves to at least initially hold the particulate material in place on said one sheet; and c) sealing the two sheets together, forming a cell of substantially greater volume than the supply of superabsorbent material so that the cell contains the particulate, superabsorbent material, and using said adhesive layer to also seal the two sheets together to form the respective cell.

9. The method of claim 8, wherein there is further included prior to step "a" the step of:

spraying said adhesive layer unto one side of said one of said sheets, covering the sheet fully over one of its sides.

10. The method of claim 8, wherein there is further included in step "c" the step(s) of:

applying heat and pressure in the areas of said two sheets surrounding the respective cell to seal the two sheets together.

11. A hydratable packet (10) for producing for juxtaposed goods a temperature environment substantially different in temperature from the ambient for a significant period of time, comprising:

a backing sheet (11);

a porous sheet (12);

a heat activated, tacky sealant layer (13) on at least one of the sheets affixing said sheets (11 & 12) together; and superabsorbent material (14) in particulate form contained between said sheets, part of said tacky sealant layer underlying, and being in direct contact with some of, said superabsorbent material, causing a substantial portion of the particulate material to stick to the sealant layer; said superabsorbent material is initially deposited on one of said sheets unto said tacky sealant layer in the form of a squat-shaped cone.

12. The hydratable packet of claim 11, wherein:

the ratio of the width or diameter of said cone to the height of said cone is at least about two-to-one (2:1).

13. The hydratable packet of claim 11, wherein:

said superabsorbent material is a multiple-cross-linked polymer.

14. The hydratable packet of claim 11, wherein:

said sealant is ethylene-methyl-acrylate (EMA).

15. The hydratable packet of claim 12, wherein:

said EMA is about twenty-two and a half (22.5%) percent.

16. The hydratable packet of claim 11, wherein:

said sheets are devoid of cellulose.

17. The hydratable packet of claim 11, wherein:

said backing sheet is made of an impervious plastic sheet material of polyester film.

18. The hydratable packet of claim 11, wherein:

said superabsorbent material is a multiple-cross-linked polymer.

19. A hydratable packet (10) for producing for juxtaposed goods a temperature environment substantially different in temperature from the ambient for a significant period of time, comprising:

a backing sheet (11) made of an impervious plastic sheet material of polyester film;

a porous sheet (12) of non-woven polypropylene; said sheets being devoid of cellulose;

a heat activated sealant layer (13) of ethylene-methyl-acrylate (EMA) on at least one of the sheets affixing said sheets (11 & 12) together in selected areas forming a cell; and superabsorbent polymer material (14) contained between said sheets in said cell, said superabsorbent material being doubly-cross-linked sodium polyacrylate, superabsorbent to water and devoid of alcohol (OH) functional groups, said superabsorbent material being in particulate form and said adhesive layer underlying and being in sticking, tacky contact with a substantial portion of said superabsorbent, particulate material, at least initially holding that portion in place on the backing sheet during the manufacture of the packet.

20. The hydratable packet of claim 19, wherein:

said superabsorbent polymer is sodium polyacrylate.

* * * * *